US008634793B2

(12) United States Patent
Landmark et al.

(10) Patent No.: US 8,634,793 B2
(45) Date of Patent: Jan. 21, 2014

(54) IP2 CALIBRATION MEASUREMENT AND SIGNAL GENERATION

(75) Inventors: Joakim Landmark, Phoenix, AZ (US); Noshir Dubash, Chandler, AZ (US); Daniel Babitch, San Jose, CA (US)

(73) Assignee: CSR Technology Inc., San Jose, CA (US)

( * ) Notice: Subject to any disclaimer, the term of this patent is extended or adjusted under 35 U.S.C. 154(b) by 442 days.

(21) Appl. No.: 12/776,818

(22) Filed: May 10, 2010

(65) Prior Publication Data

US 2011/0275341 A1    Nov. 10, 2011

(51) Int. Cl.
*H04B 1/10* (2006.01)
(52) U.S. Cl.
USPC ..... 455/295; 455/310; 455/226.1; 455/67.13; 455/67.14; 455/318
(58) Field of Classification Search
USPC ........... 455/189.1, 209, 318, 326, 226.1, 295, 455/226.4, 296–312, 67.13, 67.14
See application file for complete search history.

(56) References Cited

U.S. PATENT DOCUMENTS

| | | | | |
|---|---|---|---|---|
| 3,628,046 | A | * | 12/1971 | Bilotti .............................. 307/81 |
| 5,251,332 | A | * | 10/1993 | Hansen ...................... 455/200.1 |
| 5,483,694 | A | * | 1/1996 | Bartels et al. ................. 455/295 |
| 5,739,805 | A | | 4/1998 | Dingwall |
| 6,172,564 | B1 | * | 1/2001 | Rzyski ........................... 330/149 |
| 6,560,448 | B1 | | 5/2003 | Baldwin et al. |
| 7,554,380 | B2 | | 6/2009 | Embabi et al. |
| 2003/0176174 | A1 | * | 9/2003 | Seppinen et al. .......... 455/226.1 |
| 2004/0248532 | A1 | * | 12/2004 | Khoini-Poorfard ........... 455/132 |
| 2006/0068746 | A1 | | 3/2006 | Feng et al. |
| 2007/0066269 | A1 | | 3/2007 | Kivekas |
| 2007/0072575 | A1 | | 3/2007 | Sowlati et al. |
| 2008/0182537 | A1 | * | 7/2008 | Manku et al. ............... 455/226.1 |
| 2008/0254755 | A1 | * | 10/2008 | Kato ............................. 455/118 |
| 2009/0186587 | A1 | | 7/2009 | Sobchak |
| 2011/0076961 | A1 | * | 3/2011 | Feng et al. ................. 455/67.14 |

FOREIGN PATENT DOCUMENTS

| | | |
|---|---|---|
| EP | 2197119 A1 | 6/2010 |
| WO | WO-03079573 A1 | 9/2003 |
| WO | WO-2007113733 A2 | 10/2007 |

OTHER PUBLICATIONS

Dufrene K., "Adaptive IP2 Calibration Scheme for Direct-Conversion Receivers", IEEE, Radio and Wireless Symposium, (Jan. 17, 2006), 111-114.
United Kingdom Application Serial No. 1107757.5, Search Report mailed Aug. 18, 2011, 4 pgs.

* cited by examiner

*Primary Examiner* — Edward Urban
*Assistant Examiner* — Rui Hu
(74) *Attorney, Agent, or Firm* — RatnerPrestia

(57) ABSTRACT

A radio frequency receiver on an integrated circuit (RFIC) includes an oscillator circuit, which generates a radio frequency (RF) oscillatory signal having a predetermined frequency that is outside of an intermediate frequency passband of the RFIC. An amplitude modulator modulates the RF oscillatory signal to produce an amplitude modulated signal which is applied to a mixer that downconverts the amplitude modulated signal. A calibration circuit receives the downconverted signal, including second order modulation (IM2) products, and, responsive to the IM2 products, generates a bias signal that is applied to the mixer to reduce the IM2 products.

27 Claims, 8 Drawing Sheets

IP2 CALIBRATION MEASUREMENT AND SIGNAL GENERATION

FIELD OF THE INVENTION

The present invention relates to radio frequency receivers and, more particularly, to radio frequency receivers on an integrated circuit (RFIC) having a second order modulation (IM2) calibrator, and methods of reducing IM2 products in an RFIC.

BACKGROUND OF THE INVENTION

There is a demand for portable telecommunication devices such as cellular telephones, Global Positioning System (GPS) enabled devices, Wi-Fi® and Bluetooth® enabled portable devices, Global System for Mobile Communications (GSM) enabled portable devices, Wideband Code Division Multiplex (WCDMA) enabled portable devices, etc. As the demand increases for portable telecommunication devices with a variety of communication features, manufacturers are now combining and integrating many of these devices. For example, cellular phones are integrated with GPS receivers for providing position information.

As an increasing number of telecommunication devices are integrated together, each receiver's interference rejection to out-of-band signals may become more important. For example, higher order nonlinearities may cause out-of-band interferers to translate to an in-band spectrum of a receiver, which may result in signal degradation or a loss of signal reception. WCDMA interference, for example, may be a concern for low intermediate frequency (IF) receivers, because any second order nonlinearities in the receiver may result in the WCDMA signal being folded into the IF band.

Any higher order nonlinearities may generate spurious signals. For example, second order modulation (IM2) products may be generated when an AM signal encounters a second-order nonlinearity in the mixer circuit. One performance measure related to IM2 products is the second order intercept (IP2), which may be used to quantify the second-order distortion in the receiver. IP2 performance in an integrated circuit receiver is typically limited by device mismatch and device nonlinearity. Accordingly, the IP2 performance may be improved by directly reducing device mismatch and device nonlinearities (to minimize IM2 products) without the aid of operational circuit adjustments. This methodology, however, may require additional area on the chip, may increase the complexity, reduce the yield and may increase the power consumption.

SUMMARY OF THE INVENTION

An example embodiment includes a radio frequency receiver on an integrated circuit (RFIC) that has an oscillator circuit. The oscillator circuit generates a radio frequency (RF) oscillatory signal having a predetermined frequency that is outside of an intermediate frequency (IF) passband of the RFIC. An amplitude modulator modulates the RF oscillatory signal to produce an amplitude modulated (AM) signal that is applied to a mixer having second-order nonlinearities, producing second order modulation (IM2) products when the AM signal is processed. A calibration circuit receives the second order modulation (IM2) products, and, responsive to these products, generates a bias signal that is applied to the mixer to compensate for the second-order nonlinearities and, thus, reduce the IM2 products.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawings are the following figures.

DETAILED DESCRIPTION OF THE INVENTION

Aspects of the present invention relate to an exemplary RFIC including a calibrator to account for second order modulation (IM2) products generated in the RFIC. An exemplary calibrator may generate a predetermined RF signal that produces an output signal which, upon downconversion to an intermediate frequency (IF) band in the RFIC, may include IM2 products. In general, the IM2 products may be generated in a mixer or other circuitry of the RFIC. The exemplary calibrator may also include an IM2 calibration circuit which may detect the IM2 products in the output signal and select a bias voltage to compensate for the IM2 products. The bias voltage may be applied to the local oscillator signal at the mixer of the RFIC, to reduce the generated IM2 products. This signal may compensate for nonlinearities in the mixer and other circuitry in the IF signal processing path of the RFIC.

Figure 1:
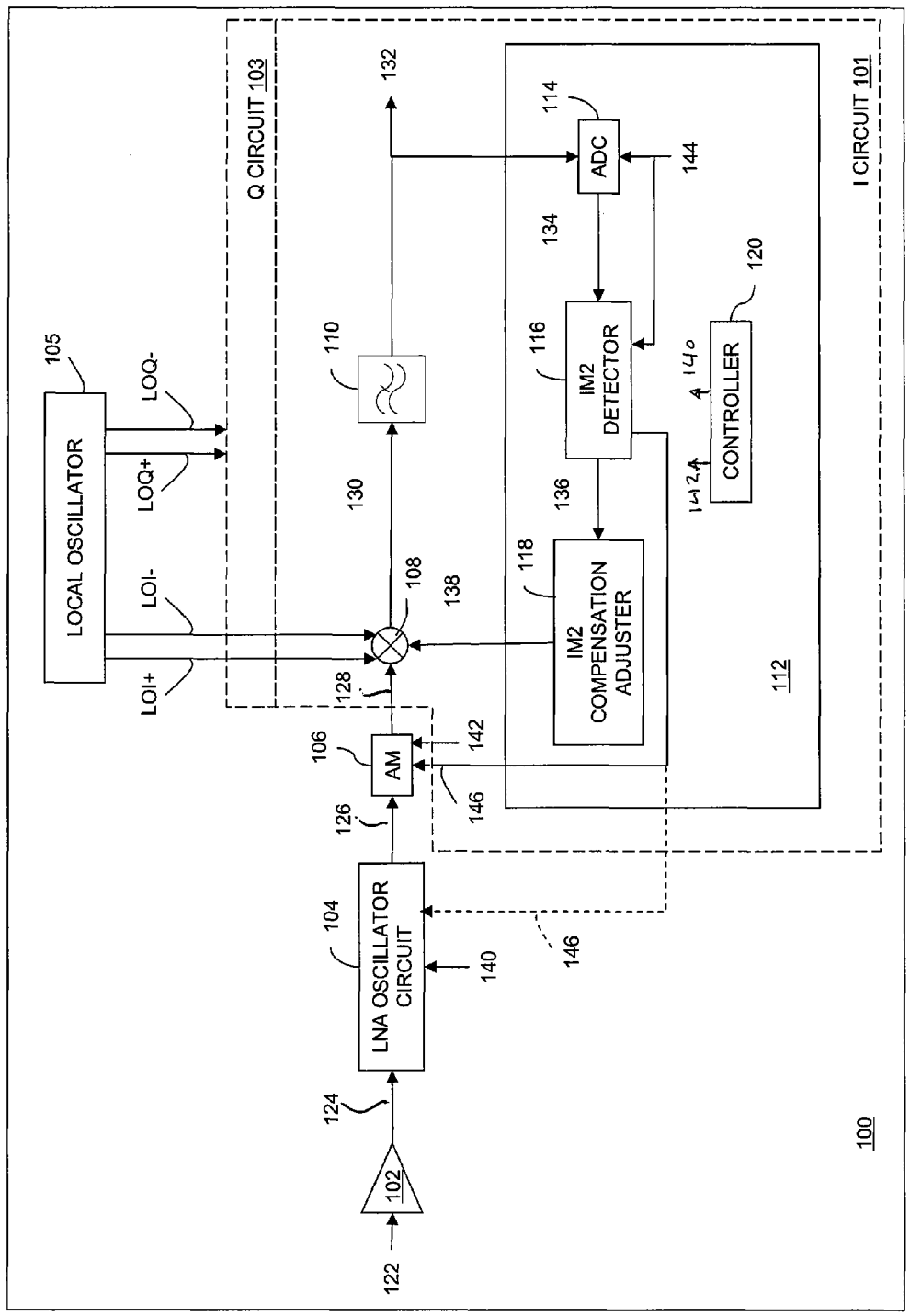
FIG. 1 is a functional block diagram of an exemplary radio frequency receiver on an integrated circuit (RFIC) according to an embodiment of the invention.

Referring to FIG. 1, a functional block diagram of an exemplary radio frequency receiver on an integrated circuit (RFIC) 100 is shown. RFIC 100 may include low noise amplifier (LNA) 102, LNA oscillator circuit 104, amplitude modulator (AM) 106 configured as a signal generating circuit. RFIC 100 also includes local oscillator 105, in-phase circuit 101 and quadrature phase circuit 103. As shown in FIG. 1, in-phase circuit 101 includes mixer 108, IF filter 110 and IM2 calibration circuit 112. The quadrature-phase circuit 103 may include similar components. For the sake of simplicity, only the in-phase circuit is described in the materials that follow.

Suitable components for use within RFIC 100 may be understood by one of skill in the art from the description herein.

In general, RFIC 100 may be operated in a normal operation mode and in a calibration measurement mode. In a normal operation mode, the LNA oscillator 104 and AM 106 are disabled so that the input RF signal 122 is received and downconverted to IF signal 132 using mixer 108. Mixer 108 mixes mixer input signal 128 with a local oscillator (LO) signal (FIG. 2A) that is offset by at least one bias voltage signal 138 (as determined by IM2 calibration circuit 112). The bias signal(s) 138 compensates the circuitry for device mismatch in the mixer 108, IF filter 110 and other circuitry (not shown) in the IF signal processing path, which may be sources of IM2 distortion.

In a calibration measurement mode, LNA oscillator circuit 104 and AM 106 generate an amplitude modulated IM2 test signal 128. As described below, the amplitude modulated signal 128 is used to detect IM2 products in mixer 108 and to determine a bias voltage signal 138 which tends to reduce the detected IM2 products. As an alternative to using the AM circuit 106, it is contemplated that the modulating signal 146 provided by the IM2 calibration circuit 112 may enable the oscillator circuit 104 when the signal 146 is in a first state (e.g. logic-high) and disable the oscillator circuit 104 when the signal 146 is in a second state (e.g. logic-low). In this configuration, the circuitry that enables and disables the oscillator may be considered to be the AM 106.

Although the exemplary embodiment of the invention described below with reference to FIGS. 3A and 3B uses the RF filter and either cross-coupled gates or the LNA 102 to form the LNA oscillator 104 in the calibration mode, it is contemplated that other circuitry may be used to form the oscillator. For example, the resonant circuit for the oscillator may be a resistor-capacitor (RC) circuit (not shown) instead of the inductor-capacitor (LC) circuit 300 that is shown in the exemplary embodiment. As another alternative, the oscillator may be a ring oscillator, formed, for example from an odd number of inverter circuits (not shown) or a number (odd or even) of non-inverting buffers (not shown), connected in a ring. The oscillatory frequency of such a ring oscillator depends on the technology used to implement the inverters or buffers (stages), as the frequency is a function of the delay exhibited by the inverters. In general, the frequency of the ring oscillator is ½DN where D is the delay through a single stage and N is the number of stages. This delay may be affected by process variations in the fabrication of the stages and it may be adjusted by adding capacitors, for example, at the input terminals of one or more of the stages. If, for example, each stage is a CMOS inverter, the added capacitor may be between the connected gate electrodes of the transistors and a source of reference potential (e.g. ground) and may act to decrease the resonant frequency of the ring oscillator.

RFIC 100 may operate in a calibration measurement mode, for example, during a start up period of the receiver. RFIC 100 may also operate in the calibration measurement mode, at other times during operation of the receiver. For example, further calibration may be performed at various instants in the lifetime of the circuit to compensate for aging of the components or when the environment of the circuit changes, for example, when an operating temperature of the receiver is greater than a predetermined operating temperature, for example, 50° C.

In an example of a normal operation mode, oscillator 302 (FIG. 3A) of LNA oscillator circuit 104 and AM 106 may be disabled by respective control signals 140, 142. In addition, one or more components of IM2 calibration circuit 112 may be disabled. Furthermore, LC tank circuit 300 (FIG. 3A) of LNA oscillator circuit 104 may be configured as a band-pass filter with a predetermined passband to filter RF input signal 122.

When the LNA oscillator circuit 104, AM 106 and IM2 calibration circuit 112 are disabled, RFIC 100 may receive input RF signal 122 at LNA 102. LNA 102 may amplify input RF signal 122 to generate an amplified signal 124 and may pass amplified signal 124 to LNA oscillator circuit 104 (configured as a band-pass filter). Amplified signal 124 may be filtered by an LC tank circuit 300 (FIG. 3A) of LNA oscillator circuit 104, to generate filtered signal 126. Filtered signal 126 may be passed through AM 106, without amplitude modulation, and may be provided to mixer 108 as a filtered and amplified mixer input signal 128. As described below, device mismatch in the mixer 108 may introduce IM2 distortion into the signal provided by the mixer.

Mixer 108 mixes mixer input signal 128 with an LO signal, offset by bias voltage signal 138, and produces resultant downconverted signal 130 having a frequency that is the difference between the frequency of the RF signal and the frequency of the LO signal. Resultant signal 130 may be further filtered by IF filter 110, to produce output signal 132. In general, IF filter 110 may select one desired channel and may reject all other channels. In an exemplary embodiment, IF filter 110 is a leapfrog filter. It is contemplated, however, that the mixer 108 may convert the filtered RF signal 126 to a baseband signal. In this configuration, the receiver is a Zero IF (ZIF) circuit and the IF filter 110 is a low-pass filter that attenuates frequency components above the frequency band of the baseband signal.

Figure 2A:
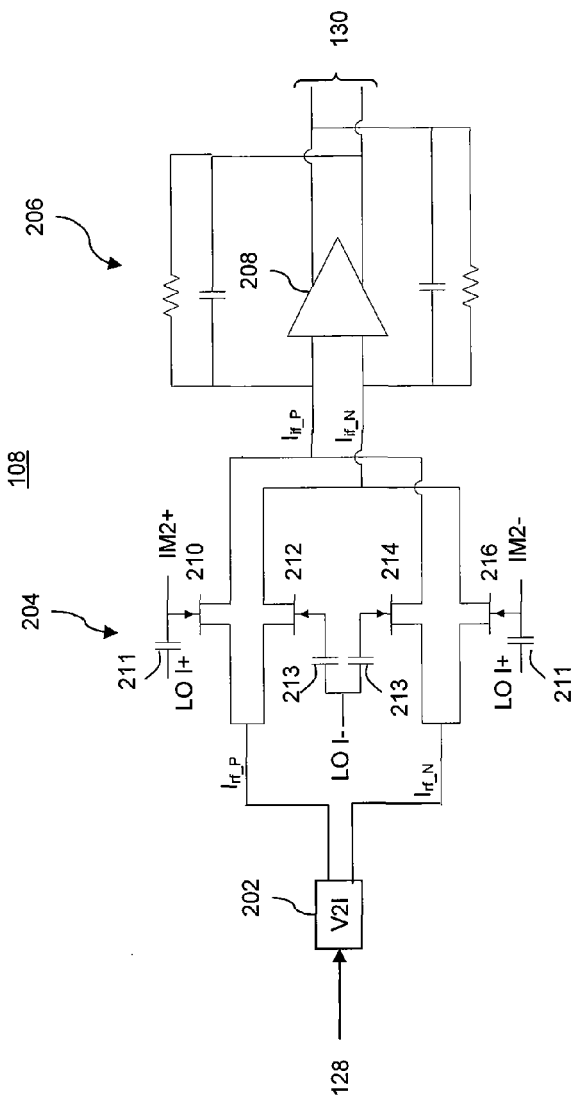
FIGS. 2A and 2B are circuit diagrams illustrating exemplary mixers included in the RFIC shown in FIG. 1, according to embodiments of the invention.
Figure 2C:
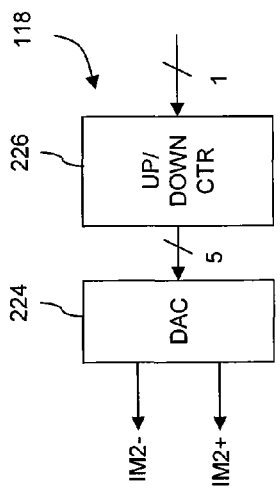
FIGS. 2C and 2D are circuit diagrams of IM2 compensation adjuster circuits suitable for use with the circuitry shown in FIGS. 2A and 2B.
Figure 2D:
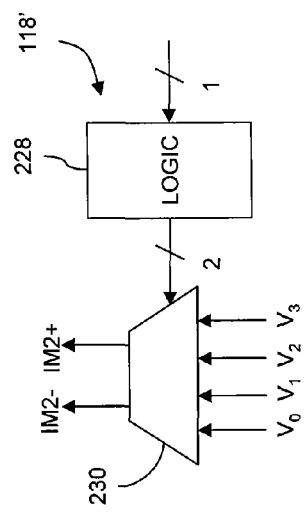
Figure 2B:
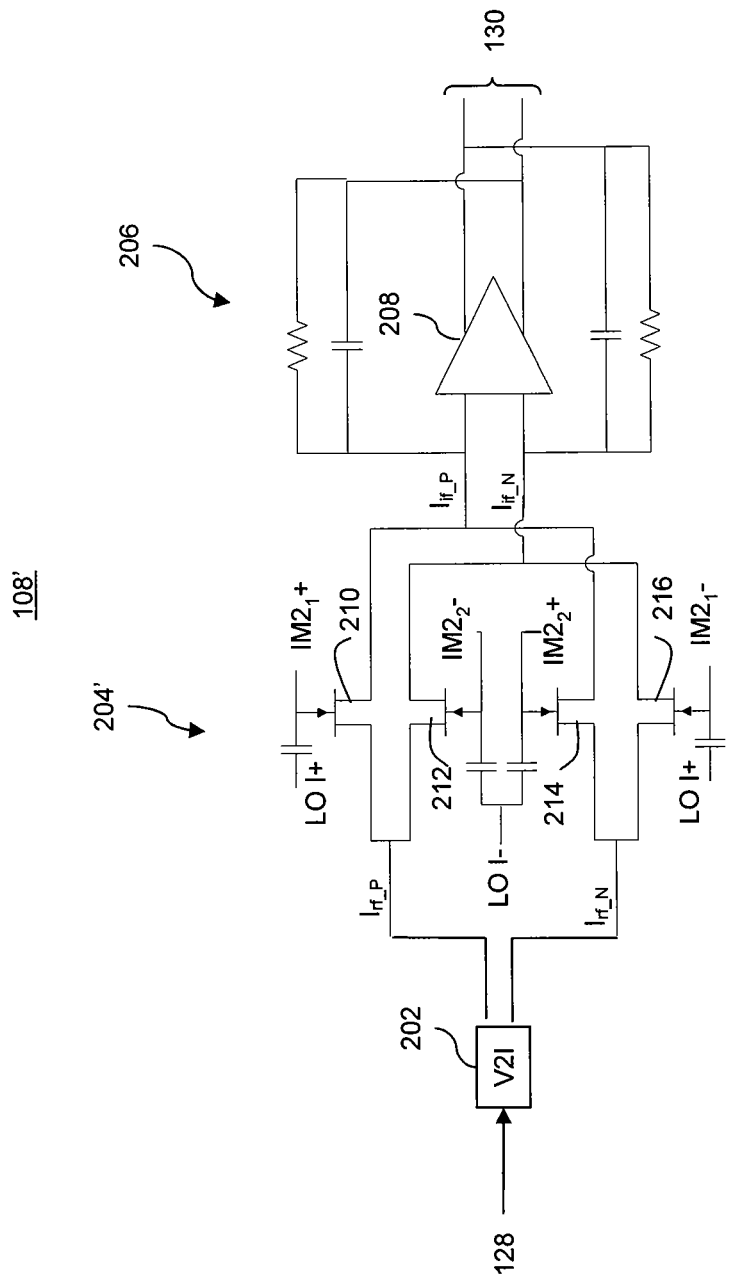

FIGS. 2A and 2B show circuit diagrams of respective mixers 108 and 108'. Mixer 108 may be a differential mixer and may include voltage to current converter 202, a current switching mixer circuit 204 and transimpedance amplifier 206.

Voltage to current (V2I) converter 202 receives mixer input signal 128 and converts mixer input signal 128 into complementary RF current signals $I_{rf\_P}$ and $I_{rf\_N}$. The RF current signal, $I_{rf\_P}$ is provided to differential transistors 210 and 212 while the complementary RF signal $I_{rf\_N}$ is provided to differential transistors 214 and 216 of current switching mixer circuit 204. The gate electrodes of transistors 210 and 216 receive the in-phase local oscillator signal, LOI+ via capacitors 211 while the gate electrodes of transistors 212 and 214 receive the complementary in-phase LO signal, LOI− via capacitors 213. In the mixer 108, the signal LOI+, applied to transistor 210 is modified by the bias voltage IM2+ and the signal LOI+ applied to transistor 216 is modified by the bias voltage IM2−. The bias voltages IM2+ and IM2− are determined by IM2 calibration circuit 112. Although the exemplary embodiment shows two bias voltages, IM2+ and IM2− being applied to the mixer 108, it is contemplated that only one bias voltage may be applied. In the circuit shown in FIG. 2A, the gates of the transistors 210 are biased by circuitry (not shown) to minimize the on-resistance of the transistors. In this embodiment, either IM2+ or IM2− may be configured to reduce this bias voltage in order to compensate for the mismatches in the mixer circuitry in order to cancel the second order non-linearity products which result in the IM2 distortion. Alternatively, the bias voltages, IM2+ and IM2− may be complementary values applied to the mixer as shown in FIG. 2A.

Referring to FIG. 2B, mixer 108' is similar to mixer 108 (FIG. 2A), except that current switching mixer circuit 204' may apply bias voltages +IM2$_1$ and −IM2$_1$ on the respective gates of transistors 210 and 216 while applying bias voltages +IM2$_2$ and −IM2$_2$ on respective gates of transistors 212 and

214 as shown. Bias voltages IM2$_1$ and IM2$_2$, which are bias signals 138 produced by IM2 compensation adjuster circuitry 118 similar to that described above, may be the same voltage or different voltages. Thus, each gate of current mixer circuit 204' may be separately adjusted with a respective bias voltage, to minimize IM2 products.

The bias voltages IM2+, IM2−, ±IM2+ and/or ±IM2− may be generated from digital signals provided by the IM2 detector 116 in an IM2 calibration circuit 118. In one exemplary embodiment, an up-down counter 226 and a digital to analog converter (DAC) 224 may be coupled to the gate electrode of one or more of the transistors 210, 212, 214 and 216 to produce one or more bias voltage signals. An example circuit for generating IM2+ and IM2− is shown in FIG. 2C. In this circuit, a one-bit signal from IM2 detector 116 which, as described below, is the sign-bit of an accumulated value, is applied to an up-down counter 226 of the IM2 calibration circuit 118. The counter increments its value (changes the value in a positive sense) when the signal from detector 116 is logic-low and decrements its value (changes the value in a negative sense) when the signal from detector 116 is logic-high. The output signal of the counter 226 is applied to a differential DAC 224 which generates either the individual bias signal IM2+ or IM2− or the complementary bias signals IM2+ and IM2−. The input signal to the IM2 calibration circuit 118 is described below.

In an exemplary embodiment, a look-up table (LUT) (not shown) may be inserted between the counter 226 and the DAC 224 to allow selected potential values to be applied as the biasing potentials IM2+ and IM2− in response to count values provided by the counter 226.

An alternative IM2 calibration circuit 118' is shown in FIG. 2D. This circuit also receives a one-bit signal from IM2 detector 116 but does not include a counter. Instead, the circuit includes a logic circuit 228 and a differential multiplexer 230. The exemplary logic circuit shown in FIG. 2D includes a two-bit register (not shown) and other logic (not shown) which generates the two-bit control signal that is applied to the control terminal of the differential multiplexer 230. The multiplexer selects one of four bias voltages, V0, V1, V2 and V3 based on the value of the register. The output signal of the multiplexer is the complementary bias voltages IM2+ and/or IM2−. In an exemplary embodiment of the invention, the logic may change the value in the register to select a higher voltage when the signal from the detector 116 is logic-low and to select a lower voltage when the signal from the detector 116 is logic-high. In one exemplary embodiment of the invention, the logic circuitry may cycle the values provided to the multiplexer from zero to three or from three to zero, responsive to the value of the one-bit input signal.

In the exemplary embodiment of the invention, the added DC component is one or more Bias voltages 138 that are applied to one or more of the differential inputs of current switching mixer circuit 204. In FIG. 2A, bias voltage 138 is represented as respective positive and negative gate voltages IM2+ and IM2−. As described above, only one of the bias voltages IM2+ or IM2− may be applied. According to another embodiment, both bias voltage IM2+ and bias voltage IM2− may be applied to the respective gates of transistors 210 and 216. Although the digital values produced in the IM2 compensation adjuster circuits 118 and 118' are described as five-bit and two-bit values, respectively, it is contemplated that larger or smaller digital values may be used in either detector with a concomitant increase or decrease in the number of possible bias voltage values that may be provided.

As described above with reference to FIG. 1, only the circuitry for the in-phase channel 101 is shown. It is contemplated, however, that the receiver may include corresponding circuitry for the quadrature-phase channel 103. Because the quadrature phase channel has a separate mixer, it may have separate IM2 calibration circuitry 112. Alternatively, IM2 calibration circuitry 112 may be shared between the in-phase and quadrature channels, for example, by alternately coupling the circuitry 112 to the in-phase channel 101 to calculate the in-phase bias value(s), as described below, and then coupling the circuitry 112 to the quadrature-phase channel to compute the quadrature-phase bias value(s). As another alternative, the multiplexing of the circuitry 112 between the in-phase and quadrature phase channels may occur while the coefficients are being calculated. In this embodiment, the accumulator, described below, may maintain two accumulated values, one for the in-phase channel 101 and the other for the quadrature phase channel 103.

Referring to FIG. 2A, current switching mixer circuit 204 mixes RF current signals $I_{rf\_P}$ and $I_{rf\_N}$ with the respective LOI signals modified by corresponding bias voltages IM2+, IM2−, to generate respective IF current signals $I_{if\_P}$ and $I_{if\_N}$. Differential transimpedance amplifier 206 includes operational amplifier 208 and suitable capacitive and resistor elements to convert IF current signals $I_{if\_P}$, $I_{if\_N}$ to resultant IF voltage signal 130.

In general, IM2 products may be generated within the current switching mixer circuit 204. Although each of the transistors 210, 212, 214 and 216 may generate substantially high IM2 products, because these transistors are typically well matched, the IM2 products should be substantially canceled at the differential output signal. The IM2 products generated by the transistors 210 and 214 are canceled by the IM2 products generated by the transistors 212 and 216. If the transistors 210, 212, 214 and 216 and all of their interconnections and signal paths were perfectly matched, the IM2 distortion would be completely canceled at the input of the amplifier 208. Even if the transistors are identical and their layout is completely complementary, however, process variations may result in differences in the operating characteristics of the transistors. Because these transistors may not be perfectly matched, IM2 products may still be present on resultant IF voltage signal 130.

Next, a calibration measurement mode is described. Referring to FIG. 1, RFIC 100 includes a calibrator including LNA oscillator circuit 104, amplitude modulator (AM) 106 and IM2 calibration circuit 112. LNA oscillator circuit 104 and AM 106 may be used to generate a predetermined test signal which results in IM2 being produced in mixer 108. IM2 calibration circuit 112 may be used to determine the bias voltage signal(s) 138 which reduces the IM2 products that are produced in mixer 108. By applying bias voltage signal 138 to mixer 108, IM2 calibration circuit 112 may deliberately introduce a mismatch between the negative and positive channels of mixer 108 to compensate for the inherent mismatch between the channels and, thus, substantially cancel IM2 products. In an example of a calibration measurement mode, LNA oscillator circuit 104 may be enabled to generate IM2 test signal 126 and AM 106 may be enabled to generate amplitude modulated signal 128, by respective control signals 140, 142. In addition, components of IM2 calibration circuit 112 may be enabled by a control signal (not shown) and the LNA 102 may be disabled by one of these control signals or by another control signal (not shown).

Figure 3A:
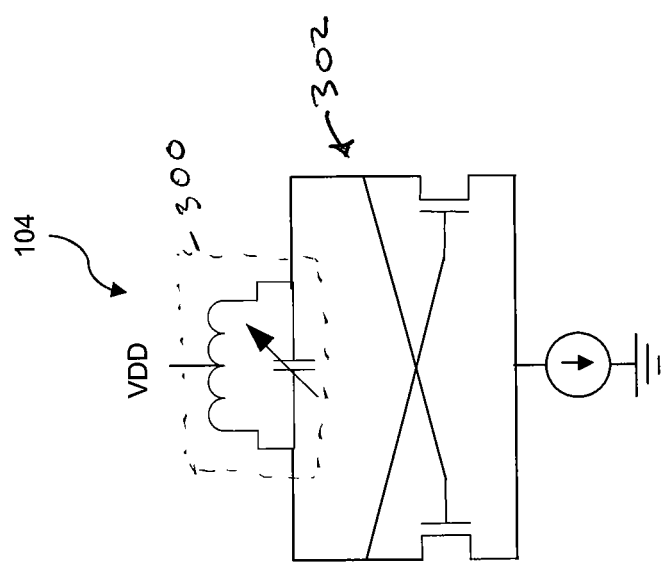
FIG. 3A is a circuit diagram of an exemplary oscillator circuit included in the RFIC shown in FIG. 1, according to an embodiment of the invention.
Figure 3B:
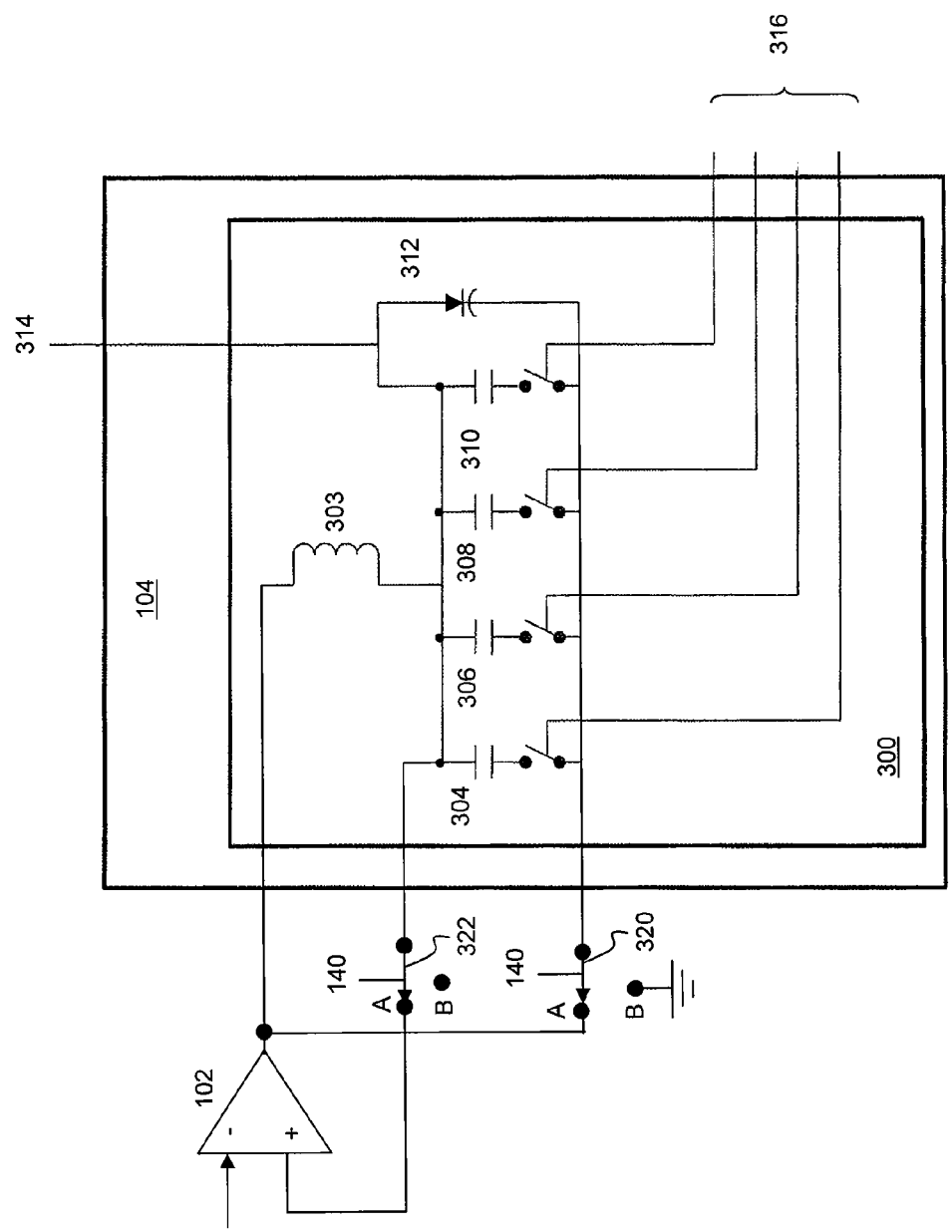
FIG. 3B is a circuit diagram of an exemplary circuit that may be configured as an RF amplifier or oscillator, according to an embodiment of the invention.

FIGS. 3A and 3B show examples of LNA oscillator circuit 104. In particular, FIG. 3A is a circuit diagram of LNA oscillator circuit 104 including LC tank circuit 300 and cross-coupled transistor oscillator 302; and FIG. 3B is a circuit diagram of LC tank circuit 300 that shows how the LNA amplifier 102 may be used with the tank circuit to form the LNA oscillator circuit 104.

In general, LC tank circuit 300 includes an inductance L which may be implemented using spiral inductors and a variable capacitance C, which may be provided by RF varactor diodes and/or switched capacitors. As shown in FIG. 3B, LC tank circuit 300 may be tuned by tuning the voltage across the varactor diode 312 and by selectively switching in or switching out ones of the capacitors 304, 306, 308 or 310. As shown in FIG. 3A, the oscillator 104 is formed from cross-coupled transistors 302 and the LC tank circuit 300. Although the circuit shown in FIG. 3A does not use the LNA 102, according to another embodiment, described below with reference to FIG. 3B, LC tank circuit 300 may combined with LNA 102 such that the LNA 102 replaces the cross-coupled transistors 302 to form the oscillator circuit 104.

In general, LC tank circuit 300 may be used by LNA 102 during the normal operation mode, with a suitably tuned frequency response as an RF filter. In addition, LC tank circuit 300 and LNA 102 may be configured as an oscillator and tuned during the calibration measurement mode to generate IM2 test signal 126. Control signal 140 (FIG. 1) may be used to configure the circuit as the oscillator 302 and to tune the LC tank circuit 300 so that the oscillator 104 produces the IM2 test signal 126.

In general, LC tank circuit 300 may be tuned to a frequency such that IM2 test signal 126 is an RF signal with a frequency that is outside of the IF passband of RFIC 100. As described above, the AM modulated signal is folded into the IF passband of the RFIC by the second-order non-linearities in components of the receiver, for example the mixer 108, to produce the IM2 components. In an exemplary embodiment, if the RF center frequency is 1575 MHz and the IF bandwidth is 6 MHz, the LC tank circuit 300 may be tuned to a frequency of about 1650 MHz, placing the oscillator frequency well outside of the IF passband. Thus, the oscillator signal, if the phase noise falling into the IF passband is sufficient, will not interfere with the ability of the calibration circuit to sense the IM2 product and to adjust the biasing signals to reduce the sensed IM2 products.

FIG. 3B shows an example LC tank circuit 300 and LNA 102 and exemplary switching circuitry that changes the function of the circuitry from an amplifier and RF filter to a RF oscillator. LNA tank circuit 300 may include a bank of fixed switched capacitors 304, 306, 308, 310 and varactor 312. For example, first switched capacitor 304 may have a capacitance C, second switched capacitor 306 may have a capacitance C/2, third switched capacitor 308 may have a capacitance C/4 and fourth switched capacitor 310 may have a capacitance C/8. Switched capacitors 304, 306, 308, 310 may be configured to provide selective RF tuning capability for LC tank circuit 300. Varactor 312 may be configured to provide a fine analog tuning capability for LC tank circuit 300 that is larger than a smallest step size between the plurality of switch capacitors 304, 306, 308 and 310. Switched capacitors 304, 306, 308, 310 may be selected by tuning control signal 316, to change the resonant frequency of the LC circuit 300, as desired. The configuration shown in FIG. 3B is exemplary only. It is contemplated that the LC tank circuit 300 may be implemented with a single capacitor that is not switched. It is also contemplated that more of fewer switched capacitors may be used and that the varactor 312 may be eliminated.

As shown in FIG. 3B, the circuitry includes two switches 320 and 322 that may be activated to configure the LNA 102 and tank circuit 300 as an oscillator. The circuitry is configured as an oscillator when the switches are in the A position and is configured as an LNA with an RF filter when the switches are in the B position. When the switches 320 and 322 are in the A position responsive to the control signal 140 (i.e. during IM2 calibration), the capacitors 304, 306, 308, 310 and the varactor diode 312, as tuned by the control signal 312, are configured in parallel with the inductor 303. One end of this circuit is connected to the +output terminal of LNA 102 and the other end is connected to the +input of the LNA 102. In this configuration, the circuit oscillates at the resonant frequency of the tank circuit 300.

When the switches 320 and 322 are in the B position (i.e. after IM2 calibration during normal operation of the receiver), capacitors 304, 306, 308, 310 and the varactor diode 312 on the one hand and the inductor 303 on the other hand are connected in series. The output of the LNA 102 is coupled to the end of the inductor 303 that is not coupled to the capacitors and the capacitors are selectively coupled to ground, responsive to the control signals 316. In this configuration, the circuitry operates as an LNA with an RF filter.

According to another embodiment, LNA oscillator circuit 104 may also be used to calibrate a frequency response of LNA 102. According to yet another embodiment, LNA oscillator circuit 104 may also be used as part of an RF/analog built in self test (BIST) for RFIC 100.

As described above, the oscillator 104 may be implemented without using the LC tank circuit. In the described examples, a ring of inverters or non-inverting buffers may be used as the oscillator. For these embodiments, the frequency of the oscillator would depend on the delay through the individual inverters or buffers.

Referring back to FIG. 1, IM2 test signal 126 is amplitude modulated by AM 106 to generate amplitude modulated signal 128. AM 106, in general, generates an amplitude modulated signal with a modulation index that is substantially close to 1, with the divided frequency signal 146 as the modulating signal. In other words, the modulated waveform will alternate between periods of the oscillatory signal and essentially no signal. As described further below with respect to FIG. 4, divided frequency signal 146 is related to sampling clock signal 144. In an exemplary embodiment, signal 146 has a frequency of 1 MHz and a 50% duty cycle so the IM2 test signal 126 is modulated by a square wave of about 1 MHz. In general, the amplitude modulation may be selected to cause mixer 108 to generate IM2 products at divided frequency signal 146. As an alternative to using a separate AM modulator, the circuitry may be configured so that the divided frequency signal 146 enables the oscillator 104 when the signal 146 is in one state (e.g. logic-high) and disables the oscillator 104 when it is in the other state (e.g. logic-low). This would produce an output signal with a modulation index of 1.

Mixer 108 mixes amplitude modulated signal 128 with a LO signal to produce heterodyned signal 130. In general, mixer 108 heterodynes amplitude modulated signal 128 subject to any second order nonlinearities produced by switching devices 210 (FIG. 2A) of mixer 108. Resultant heterodyned signal 130 has a frequency band that is within the IF passband and that may include IM2 products corresponding to the portion of the modulating waveform having the oscillatory signal. Resultant signal 130 may be further filtered by IF filter 110, to produce output signal 132.

In general, IM2 products may represent one of many DC components on output signal 132. By performing amplitude modulation on IM2 test signal 126, IM2 products may be distinguished from other sources of DC signal components. IM2 calibration circuit 112 may, thus, detect IM2 products, without detecting other DC components. For example, IM2 calibration circuit 112 may detect IM2 products during "high" periods of output signal 132 (related to the amplitude modulated signal 128) and may subtract output signal 132 during the "low" periods, to remove other DC components.

During the calibration interval, IM2 calibration circuit 112 may receive the output signal 132 of the mixer 108 and IF filter (including any IM2 products) and may determine a bias voltage signal 138 that reduces IM2 products in mixer 108. IM2 calibration circuit 112 may include analog to digital convertor (ADC) 114, IM2 detector 116, and IM2 coefficient adjustor 118. IM2 calibration circuit 112 may also include controller 120 for controlling one or more components of IM2 calibration circuit 112. Controller 120 may also provide control signals 140 and 142 to respective LNA oscillator circuit 104 and AM 106. It is understood that at least some of the processes performed by controller 120 may be performed by IM2 coefficient adjuster 118. For the sake of clarity, connections between ADC 114, IM2 detector 116, IM2 coefficient adjustor 118 and controller 120 are not shown in FIG. 1.

ADC 114 may receive, responsive to sampling clock signal 144, output signal 132 and may convert output signal 132 to digital signal 134. In an exemplary embodiment, ADC 114 is operated in a 5 bit mode. In one exemplary embodiment, sampling clock signal 144 has a frequency of 48 MHz.

IM2 detector receives digital signal 134 and generates a sequence of one-bit values 136 that represent accumulated products over N respective pulses of frequency divided signal 146, where N is an integer value. In an exemplary embodiment, the number of pulses N is equal to 48.

IM2 compensation adjustor 118 receives sign bits 136, representing the N pulses, and determines bias voltage signal 138 based on sign bits 136. In general, bias voltage signal 138 may be selected such that sign bits 136 are substantially equally balanced between negative and positive values over the N pulses. For example, if the sign bit 136 of the accumulated value is positive after the detected IM2 products corresponding to a number of pulses have been processed, the bias voltage signal 138 that is applied to the negative channel of mixer 108 (FIG. 1) may be increased. Bias voltage signal 138 may be selected from a lookup table (LUT) (not shown), based on the accumulated value of sign bits 136 over N pulses. The bias voltage signal 138 in the LUT may be predetermined, for example, based on circuit simulation. In an exemplary embodiment, bias voltage signal 138 is a 5 bit control word.

In general, a process of detecting sign bit 136 and selecting bias voltage signal 138 may be repeated over M iterations, where M is an integer. In an exemplary embodiment, M is equal to 12 but it is contemplated that M may be any number. In this manner, IM2 compensation adjustor 118 may adjust bias voltage signal 138 over M iterations, to substantially reduce any IM2 products in digital signal 134. It is contemplated that bias voltage signal 138 may be adjusted by successive approximation or by stepping through predetermined bias voltage settings.

Figure 4:
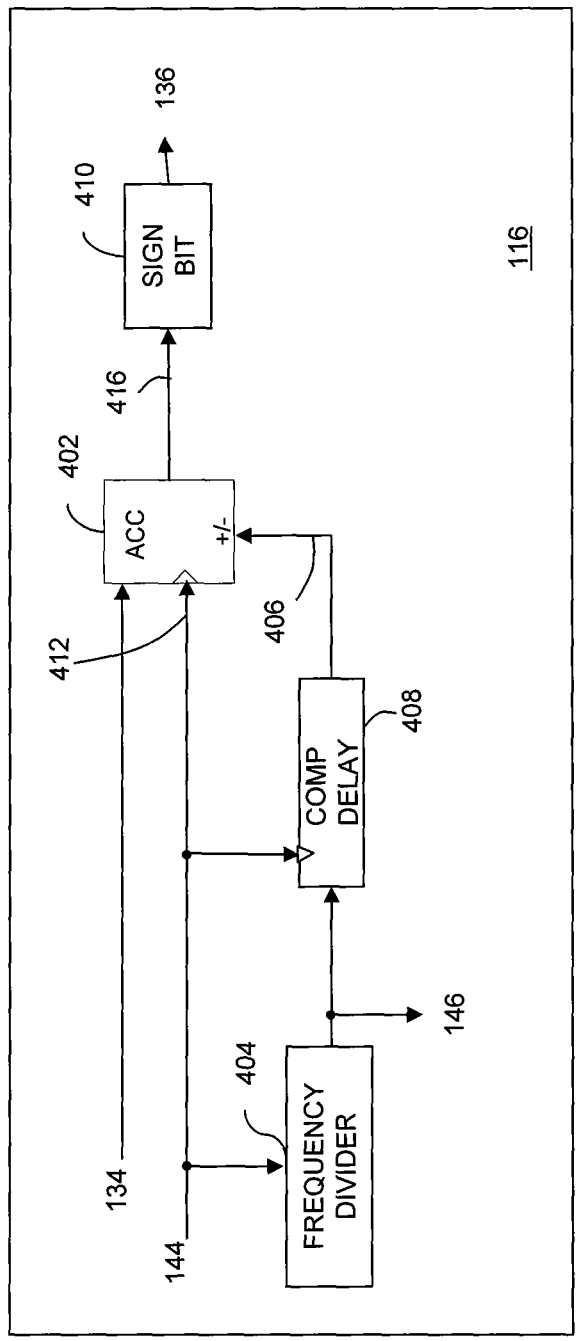
FIG. 4 is a functional block diagram of an IM2 detector circuit included in the RFIC shown in FIG. 1, according to an embodiment of the invention.

Referring to FIG. 4, a functional block diagram of IM2 detector 116 is shown. IM2 detector 116 includes accumulator 402, frequency divider 404, logic AND gate 406, delay 408 and register 410.

Sampling clock signal 144 is provided to frequency divider 404, to the clock input terminals of the delay element 408 and the accumulator 402. Frequency divider 404 produces frequency divided signal 146 having a 50 percent duty cycle, and a frequency that is a fraction of a frequency of sampling clock signal 144. In an exemplary embodiment, the frequency of the clock signal 144 is 48 MHz and the frequency of the divided signal 146 is 1 MHz. Frequency divided signal 146 is provided to the delay element 408 from which it is applied, as the signal 406, to a add/subtract input terminal of the accumulator 402.

The frequency divided signal 146 is also applied to the AM 106 (shown in FIG. 1) as the modulating signal. The delay 408 is a compensating delay which compensates for the processing time through the amplitude modulator 106, mixer 108, IF filter 110 and ADC 114. Accumulator 402 alternately adds samples representing IM2 products plus other DC components and the subtracts samples representing just the DC components. The samples representing the IM2 products and DC components are obtained when the amplitude of the modulated signal is high and the samples representing just the DC components are obtained when the amplitude of the modulated signal is low. Thus, the ADD/SUBTRACT input of the accumulator 402 is held in the ADD state until the first samples of the modulated signals resulting from the logic-high portion of the modulating pulse are processed and digitized by ADC 144. When logic low-portion of the modulating pulse is digitized, the signal the ADD/SUBTRACT signal switches to SUBTRACT to subtract the DC components from the accumulated values representing the combination of the IM2 products and DC components.

As described above, accumulator 402 accumulates digital signal 134, representing the IM2 distortion minus other DC components, during for N pulses of the sampling of the sampling clock signal 144. This produces a signed output value at the end of each N pulses. In the exemplary embodiment, only the sign bit 416 of accumulator 402 is stored in register 410 for each accumulated value. According to another embodiment, a multi-bit output signal of accumulator 402 (over all N pulses) may also be stored in register 410, either to calculate the bias values or to evaluate the calibration process.

Figure 5:
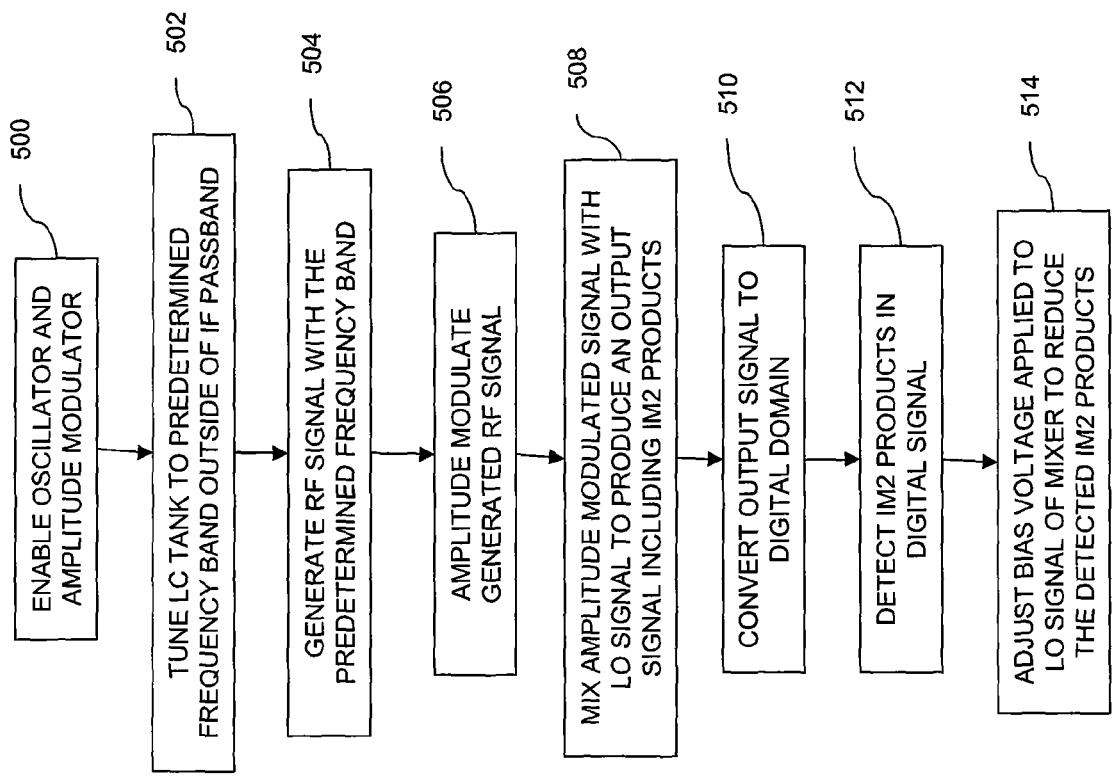
FIG. 5 is a flowchart illustrating an exemplary method for calibrating an RFIC to account for IM2 products, according to an embodiment of the invention.

Referring to FIGS. 1 and 5, a flow chart illustrating an exemplary method for calibrating RFIC 100 to account for IM2 products is shown. At step 500, LNA oscillator circuit 104 and AM 106 are enabled, for example, by respective control signals 140, 142 provided by controller 120 of IM2 calibration circuit 112. At step 502, LC tank circuit 300 (FIG. 3A) is tuned to predetermined frequency band outside of the IF passband of RFIC 100. At step 504, IM2 test signal 126 is generated, for example, using LC tank circuit 300 (FIG. 3A) and oscillator 302, such that IM2 test signal 126 includes a predetermined frequency band outside of the IF passband.

At step 506, the generated IM2 test signal 126 is amplitude modulated, for example, by AM 106 using the frequency divided signal 146 as the modulating signal. At step 508, amplitude modulated signal 128 is mixed with LO signals, for example, in mixer 108 to produce output signal 130 including IM2 products and other DC components alternating with signals representing only the other DC components. Output signal 130 may be further filtered, for example, by IF filter 110 to produce output signal 132.

At step 510, output signal 132 is converted to digital signal 134, for example, by ADC 114. At step 512, IM2 products are detected in digital signal 134, for example, by IM2 detector 116 which subtracts the other DC components, as described above. At step 514, bias voltage signal 138 is adjusted to reduce the detected IM2 products, for example, by IM2 compensation adjuster 118.

Figure 6:
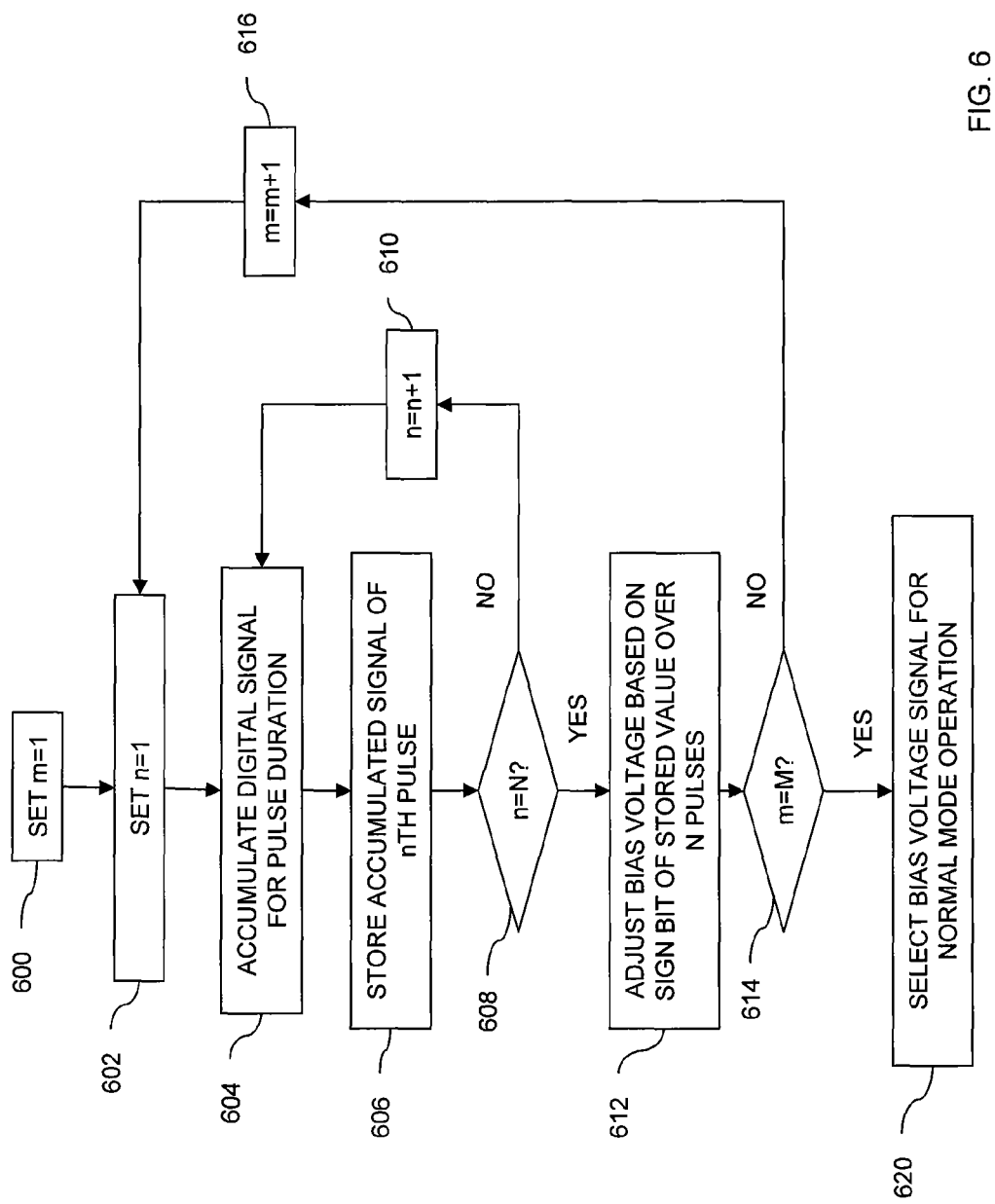
FIG. 6 is a flowchart illustrating an exemplary method for selecting a bias voltage which is applied to a mixer of an RFIC, based on detected IM2 products, according to an embodiment of the invention.

Referring to FIGS. 1, 4 and 6, a flow chart illustrating an exemplary method for selecting a bias voltage signal 136 applied to mixer 108 of RFIC 100 is shown. At step 600, iteration index m is set to 1, and at step 602, pulse index n is set to 1, for example, by controller 120.

At step 604, digital signal 134 is accumulated for pulse n, for example, by accumulator 402 of IM2 detector 116. At step 606, this value is stored for the nth in the accumulator 402.

At step 608, it is determined whether pulse index n is equal to total number of N pulses. If index n is not equal to N, step 608 proceeds to step 610. At step 610, pulse index n is incremented and step 610 proceeds to step 604. Step 604-610 are repeated until pulse index n is equal to total number of pulses N.

If pulse index n is equal total number of pulses N, step 610 proceeds to step 612. At step 612, bias voltage signal 138 is adjusted, for example, by IM2 compensation adjuster 118, responsive to the sign bit 136 of the accumulated value over the N pulses.

At step 614, it is determined whether iteration index m is equal to a total number of M iterations. If iteration index m is not equal to M, step 614 proceeds to step 616. At step 616, iteration index m is incremented and step 616 proceeds to step 602. Step 602-616 are repeated until iteration index m is equal to total number of iterations M.

If index m is equal total number of iterations M, step 614 proceeds to step 620. At step 620, a bias voltage 138 (adjusted in step 612 for iteration M) is selected and used in conjunction with the LO signals of mixer 108, during a normal operation mode of RFIC 100.

Although FIG. 6 illustrates the adjustment of bias voltage signal 138 over M iterations, according to another embodiment, bias voltage signal 138 may be adjusted over one iteration of m (i.e., where M is equal to 1). Accordingly, in this embodiment, steps 602-612 may be performed, followed by step 616.

According to aspects of the present invention, LC tank circuit 300 (FIG. 3A) may be used for both LNA 102 and for generating an IM2 test signal, for IM2 calibration. Thus, only additional components that may be included in RFIC 100 are the oscillator 302 (FIG. 3A) amplitude modulator 106 and IM2 calibration circuit 112. Because these circuit elements are small compared to LC tank 300, an IM2 test signal may be generated without a substantial increase in chip area.

In addition, RFIC includes AM 106, to generate an amplitude modulated test signal. As described above, this circuit may be eliminated by turning the oscillator 104 on and off responsive to the frequency divided signal 146 to generate the amplitude modulated signal 126. In this configuration, the switch that controls the oscillator may be considered to be the AM 106. Because the amplitude modulated waveform may be used to separate low frequency IM2 products from other DC sources, no additional advanced DACs are needed to detect IM2 products. Furthermore, because LNA oscillator circuit 104 may tune the IM2 test signal out of band, the remainder of the receiver may be reused to filter out IM2 products from the IF signal (generated by mixer 108).

Although the invention has been described in terms of systems and methods for providing IM2 calibration in an RFIC, it is contemplated that one or more products may be implemented in software on microprocessors/general purpose computers (not shown). In this embodiment, one or more of the functions of the various components may be implemented in software that controls a general purpose computer. This software may be embodied in a non-transient computer readable medium, for example, a magnetic or optical disk or a memory-card.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A radio frequency receiver on an integrated circuit (RFIC), the RFIC comprising: a local oscillator configured to provide a local oscillatory signal; a mixer; a low noise amplifier (LNA); a resonant circuit; an amplitude modulator; wherein when the RFIC is configured in a first mode, 1) the LNA amplifies received RF signals which are then passed to the resonant circuit, 2) then the resonant circuit bandpass filters the amplified received RF signals which are then passed to the mixer, and wherein when the RFIC is configured in a second mode, the resonant circuit and the LNA generate an oscillatory signal and the amplitude modulator [generate and pass] modulates the oscillatory signal to provide predetermined amplitude modulated (AM) RF signals to the mixer, the mixer coupled to the amplitude modulator and to the local oscillator for downconverting the predetermined AM RF signals to produce intermediate frequency (IF) signals having frequencies within an IF passband; and a calibration circuit coupled to the mixer, the calibration circuit configured to receive the IF signal from the mixer when the RFIC is in the second mode, to detect second order modulation (IM2) products in the IF signal, to generate a bias signal, to apply the bias signal to the mixer and to adjust the bias signal in a sense determined by the detected IM2 products to reduce the IM2 products.

2. The RFIC according to claim 1,
wherein the RFIC includes an RF amplifier configured to be coupled to an antenna to provide the received RF signals when the RFIC is in the first mode, and
wherein the predetermined AM RF signals have a frequency outside of the IF passband.

3. The RFIC according to claim 2, wherein the receiver includes an oscillatory circuit coupled to the resonant circuit which produces predetermined RF signals.

4. The RFIC according to claim 3, wherein the amplitude modulator modulates the predetermined RF signals produced by the oscillatory circuit with a modulating signal to produce the predetermined AM RF signals passed to the mixer.

5. The RFIC according to claim 1, wherein the calibration circuit is configured to measure the IM2 products over a plurality of clock pulses and to select the bias voltage based on the measured IM2 products over the plurality of clock pulses.

6. The RFIC according to claim 1, wherein the mixer includes:
a differential mixer including a plurality of switching devices, and
wherein the plurality of switching devices are configured to receive respective local oscillator (LO) signals, wherein at least one of the LO signals is modified by the bias voltage to reduce the IM2 products.

7. The RFIC according to claim 1, wherein the RFIC includes an RF amplifier, a filter circuit and circuitry which, responsive to a control signal, reconfigures the RF amplifier and the filter circuit as an oscillatory circuit to generate predetermined RF signals which are amplitude modulated to generate the predetermined AM RF signals.

8. The RFIC according to claim 1, further including control circuitry which controls the oscillatory circuit to generate predetermined RF signals which are amplitude modulated to generate the predetermined AM RF signals in a calibration mode and disables the oscillatory circuit in an operational mode.

9. The RFIC according to claim 1, further comprising an IF filter, coupled to the mixer, the IF filter configured to filter the IF signal of the mixer within the IF passband to provide a filtered IF output signal to the calibration circuit.

10. The RFIC according to claim 9, wherein the calibration circuit comprises:
an analog to digital converter configured to digitize the output signal of the IF filter;
an IM2 detector circuit configured to accumulate the IM2 products during a calibration interval; and
an IM2 compensator circuit, responsive to the accumulated IM2 products to provide the bias signal to the mixer.

11. The RFIC according to claim 1,
wherein when the RFIC is configured in the second mode, the LNA is configured as an oscillator and is coupled to the resonant circuit, the LNA generates RF signals in conjunction with the resonant circuit which are then modulated by the AM and passed to the mixer.

12. A method for calibrating a radio frequency receiver on an integrated circuit (RFIC) for second order modulation (IM2) products, the method comprising:
configuring the RFIC in a first mode to 1) amplify a received RF signal using a low noise amplifier (LNA), and then 2) bandpass filter the amplified received RF signal using a resonant circuit;
configuring the RFIC in a second mode to generate a radio frequency (RF) oscillatory signal using the resonant circuit, the RF oscillatory signal having a frequency that is outside of an intermediate frequency (IF) passband of the RFIC in response to receiving instructions to switch between filtering the received RF signal and generating the RF oscillatory signal;
modulating the RF oscillatory signal with a periodic modulating signal to provide an amplitude modulated signal;
mixing the amplitude modulated signal with a local oscillator (LO) signal in a mixer to generate a downconverted signal including a second order modulation (IM2) products;
detecting the IM2 products and
adjusting a bias voltage applied to the mixer in a sense determined by the detected IM2 products to reduce the detected IM2 products.

13. The method according to claim 12, wherein adjusting the bias voltage includes:
measuring the IM2 products from the downconverted signal over a plurality of periods of the modulating signal; and
generating the bias voltage based on the measured IM2 products over the plurality of periods of the modulating signal.

14. The method according to claim 13, wherein:
the downconverted signal includes the IM2 products and direct-current (DC) component signals during first intervals of the modulating signal and the DC component signals to the exclusion of IM2 products during second intervals of the modulating signal which alternate with the first intervals; and
the measuring the IM2 products includes, for each of the clock pulses accumulating values representing the IM2 products and DC component signals during the first intervals and subtracting the DC component signals from the accumulated values during the second intervals to measure the IM2 products.

15. The method according to claim 14, wherein generating the bias voltage includes:

accumulating values of the measured IM2 products over a plurality of the intervals to produce an accumulated value; and
changing the bias voltage in a first sense if the accumulated value has first sense and in a second sense, opposite to the first sense, if the accumulated value has a second sense.

16. The method according to claim 15, further wherein the accumulated values are signed values having respective sign bits and the step of changing the bias voltage includes selecting the sign bit of the measured IM2 products to determine the sense of the accumulated IM2 products.

17. The method according to claim 13, further comprising repeating the measuring of the IM2 products and the generating of the bias voltage.

18. The method according to claim 12, wherein the modulating signal is a square wave signal and the modulator modulates the RF oscillatory signal with a modulation index of 1.

19. The method according to claim 12, the further including:
detecting an operating temperature of the RFIC; and
further adjusting the bias voltage applied to the mixer when the detected operating temperature of the RFIC has changed by an amount greater than a predetermined temperature.

20. An second order modulation (IM2) calibrator in a radio frequency receiver on a integrated circuit (RFIC) having a mixer, the IM2 calibrator comprising: a low noise amplifier (LNA); a resonant circuit; an amplitude modulator; wherein in a first mode, 1) the LNA amplifies received RF signals which are then passed to the resonant circuit, and then 2) the resonant circuit bandpass filters the amplified received RF signals, and wherein in a second mode, the LNA and the resonant circuit generate an oscillatory signal and the amplitude modulator modulates the oscillatory signal to generate an amplitude modulated RF oscillatory signal having a predetermined frequency that is outside of an intermediate frequency (IF) passband of the RFIC, the generated RF signal causing the mixer to produce an output signal that is within the IF passband and that includes IM2 products; and an IM2 calibration circuit, coupled to the mixer, the IM2 calibration circuit including: an IM2 detector configured to receive the output signal and to detect the IM2 products in the output signal, and an IM2 compensation adjustor configured to generate a bias voltage applied to the mixer, based on the detected IM2 products.

21. The IM2 calibrator according to claim 20, wherein the RFIC includes:
an oscillator coupled to the resonant circuit configured to generate the RF oscillatory signal.

22. The IM2 calibrator according to claim 21, wherein the resonant circuit is an LC tank circuit.

23. The IM2 calibrator according to claim 21, wherein the RFIC further includes an amplitude modulator, coupled to the oscillator and the mixer, the amplitude modulator configured to modulate the generated RF oscillatory signal with a square-wave signal to provide the modulated RF oscillatory signal,
wherein the mixer generates the output signal from the amplitude modulated signal and a local oscillator (LO) signal.

24. The IM2 calibrator according to claim 23, wherein the amplitude modulator includes a switch, responsive to the square wave signal, for enabling the oscillator when the square wave has a first value and disabling the oscillator when the square wave signal has a second value, different from the first value.

25. The IM2 calibrator according to claim 20, further comprising a controller, configured to control generation of the RF signal and the selection of the bias voltage.

26. A second order modulation (IM2) calibrator in a radio frequency receiver on a integrated circuit (RFIC) having a mixer, the IM2 calibrator comprising:
- a signal generator, coupled to the mixer, configured to switch between filtering a received RF signal and generating an amplitude modulated RF oscillatory signal having a predetermined frequency that is outside of an intermediate frequency (IF) passband of the RFIC, the generated RF signal causing the mixer to produce an output signal that is within the IF passband and that includes IM2 products; and
- an IM2 calibration circuit, coupled to the mixer, the IM2 calibration circuit including:
  - an IM2 detector configured to receive the output signal and to detect the IM2 products in the output signal, the IM2 detector including an accumulator for accumulating the IM2 products to the exclusion of other direct current (DC) components over a plurality of clock pulses, and a register for storing a single bit value associated with the accumulated IM2 products for each of the clock pulses; and
  - an IM2 compensation adjustor configured to generate a bias voltage applied to the mixer, based on the detected IM2 products.

27. The IM2 calibrator according to claim 26, wherein the IM2 compensation adjustor generates the bias voltage based on respective values of the single bit value bit over the plurality of pulses.

* * * * *

UNITED STATES PATENT AND TRADEMARK OFFICE
CERTIFICATE OF CORRECTION

PATENT NO.        : 8,634,793 B2
APPLICATION NO.   : 12/776818
DATED             : January 21, 2014
INVENTOR(S)       : Landmark et al.

Page 1 of 1

It is certified that error appears in the above-identified patent and that said Letters Patent is hereby corrected as shown below:

In the Specifications

In Column 5, Line 9, delete "IM2 calibration circuit 118." and
insert -- IM2 calibration circuit 112. --, therefor.

In Column 5, Lines 17-18, delete "IM2 calibration circuit 118." and
insert -- IM2 calibration circuit 112. --, therefor.

In Column 5, Lines 25-26, delete "IM2 calibration circuit 118" and
insert -- IM2 calibration circuit 112 --, therefor.

In Column 10, Line 20, delete "ADC 144." and insert -- ADC 114. --, therefor.

In Column 10, Line 64, delete "bias voltage signal 136" and
insert -- bias voltage signal 138 --, therefor.

In the Claims

In Column 13, Line 41, in Claim 12, delete "products and" and
insert -- products; and --, therefor.

Signed and Sealed this
Twenty-second Day of April, 2014

Michelle K. Lee
*Deputy Director of the United States Patent and Trademark Office*